Oct. 11, 1932.   R. F. PEO   1,881,956
SHOCK ABSORBER
Filed Feb. 10, 1930
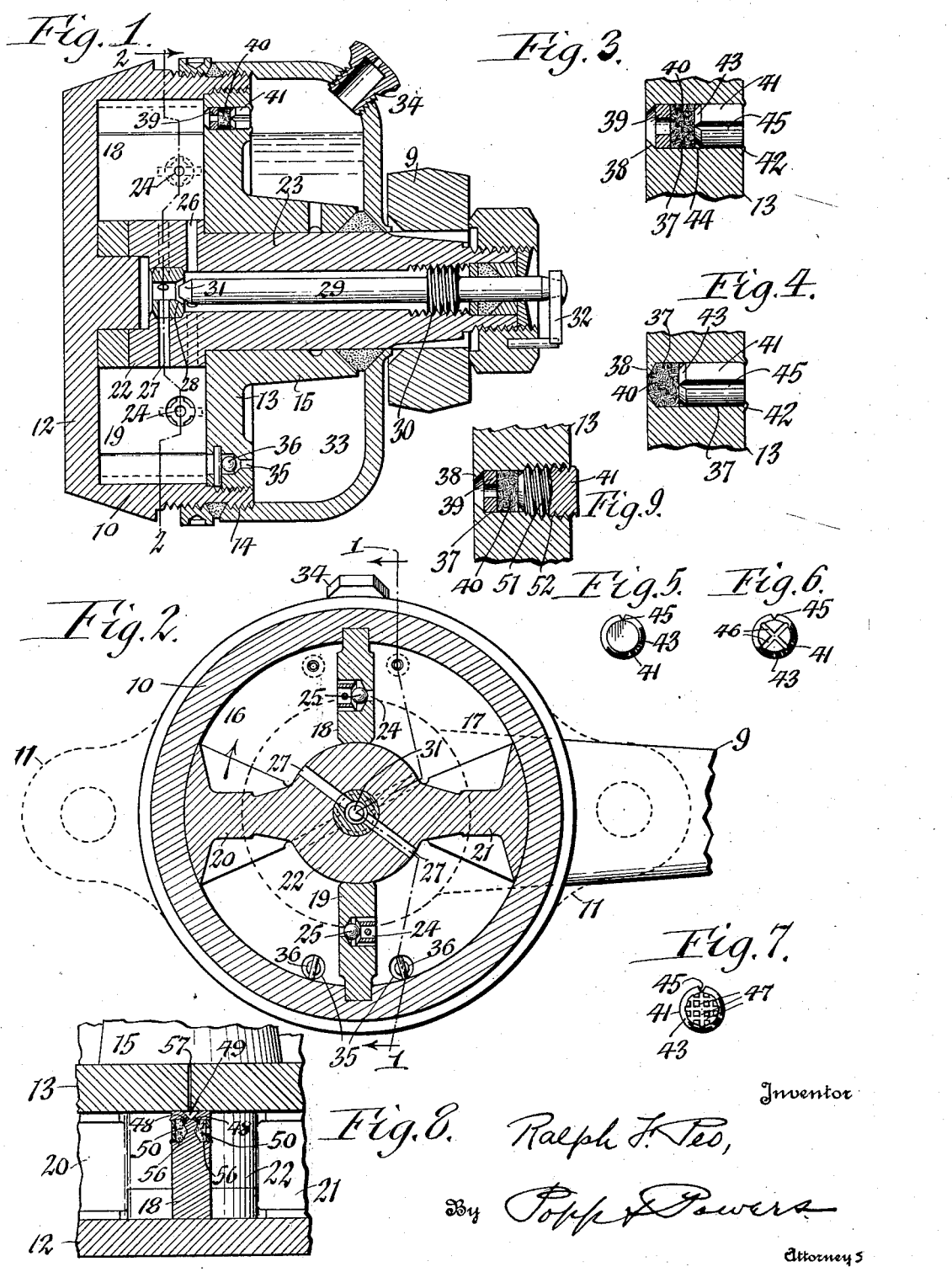

Patented Oct. 11, 1932

1,881,956

UNITED STATES PATENT OFFICE

RALPH F. PEO, OF KENMORE, NEW YORK, ASSIGNOR TO HOUDE ENGINEERING CORPORATION, OF BUFFALO, NEW YORK, A CORPORATION OF NEW YORK

SHOCK ABSORBER

Application filed February 10, 1930. Serial No. 427,107.

This invention relates to a shock absorber which is more particularly intended for use on automobiles although the same may also be used in other installations requiring cushioning of relatively moving parts.

It has been found that in any type of shock absorbers using a resistance liquid, it is desirable that the liquid should be free from air or other gases and that none be allowed to collect in the working chambers as this would be alternately compressed and expanded due to the oscillating or reciprocating action of the pistons. The rate of motion and the resistance in this type of shock absorber is governed by the size of liquid passages, clearances between parts and valve openings which are designed to allow the liquid to pass from a high to a lower pressure chamber at a predetermined rate. It is a property of the liquid used in this type of shock absorbers that it is very slightly compressed by pressure in resisting the movements of the pistons, whereas if air or gases are subjected to this pressure they will be compressed a relatively large amount.

Thus, if air or gases are allowed to remain in the working chambers the resistance of the shock absorber will be less than required and its usefulness impaired.

The object of this invention is to provide means whereby due to the action of the shock absorber, air or gases will be discharged from the working chambers during high pressure strokes of the piston or when the pressure is higher than in the replenishing chamber but which will prevent the same from returning or re-entering the working chamber when the pressure in the working chamber has been reduced or becomes less than that in the replenishing chamber.

In the accompanying drawing:

Figure 1 is a vertical longitudinal section of one form of hydraulic shock absorber containing one embodiment of my invention.

Figure 2 is a vertical transverse section of the same taken on line 2—2 Fig. 1.

Figure 3 is a fragmentary vertical section, on an enlarged scale, of the vent filtering means shown in Fig. 1.

Figure 4 is a similar view of a modified form of the vent filtering means.

Figure 5 is an end view of the vent plug shown in Figs. 1, 3 and 4.

Figures 6 and 7 are similar views showing modified forms of the vent plug.

Figure 8 is a fragmentary horizontal section of the working and replenishing chambers, the partition between the working chambers and the venting and filtering means communicating with the several chambers.

Figure 9 is a fragmentary section showing a modified form of vent passage on the retaining plug.

In the following description similar characters of reference indicate like parts in the several figures of the drawing.

This invention is applicable to hydraulic shock absorbers and damping and cushioning devices of various types regardless of whether the pistons reciprocate lengthwise in a cylinder or oscillate circumferentially in a segmental working chamber and it is therefore to be understood that this invention is not confined to any particular form except as defined by the appended claims.

The shock absorber which is shown in the drawing, as an example of one suitable for use in connection with this invention is constructed as follows:—

The body of the shock absorber in the present case is provided with a cylindrical wall 10 which is adapted to be connected with the frame of the automobile by bolts passing through lugs 11 on opposite sides of this wall. At its inner or rear end the space within the wall 10 is closed by a rear head 12 which is preferably formed integral therewith and at its front end this space is closed by a transverse front head or wall 13 which is connected with the circular wall by a screw joint 14 and provided centrally with a forwardly projecting bearing 15. The cylindrical space within the circular wall and front and rear heads of the body is divided into two segmental working chambers 16, 17 by a diametrical partition composed of upper and lower sections 18, 19. Within the working chambers two pistons 20, 21 oscillate back and forth, these pistons being formed on opposite sides of a hub 22 which has a rock shaft 23 journaled in the bearing 15 and connected externally of the absorber by a rock arm 9 or any other suitable means with an axle of the automobile so that when the spring between the frame and axle is compressed the pistons will be moved backwardly in the working chambers with a low pressure stroke toward the low pressure ends of the working chambers, and when the frame and axle of the car separate during rebound of the spring means the pistons will be moved toward the high pressure ends of the working chambers.

The arrow associated with the pistons in Fig. 2 indicates the direction which the same move when making a high pressure or rebound stroke, it being understood that when the pistons move in a direction opposite to the arrow that the same are effecting a low pressure stroke. Each of the partitions or sections 18, 19 contains a port 24 controlled by a check valve 25 whereby during low pressure stroke the resistance liquid can flow from the upper low pressure end of the right working chamber 17 to the upper high pressure end of the left working chamber 16, and from the lower low pressure end of the left working chamber 16 to the lower high pressure end of the right working chamber, but during a reversed movement of the pistons these check valves are closed and prevent the flow of resistance liquid through the partition sections so that a greater resistance is offered to the movement of the pistons during the high pressure strokes than during the low pressure strokes.

In order to permit of regulating the liquid resistance to the movement of the pistons adjustable by-pass means are provided for the flow of the liquid which in the present case consist of by-pass ports 26, 27 formed on the hub of the pistons and leading from opposite sides of the pistons to point arranged in front and in rear of a valve seat 28 within the axis of the piston hub, and a regulating valve stem 29 adjustable lengthwise in the rock shaft by means of a screw joint 30 and provided at its inner end with a valve 31 movable toward and from the valve seat and provided at its outer end with a handle 32 for adjusting this valve stem and capacity of the by-pass. Upon opening the by-pass more or less the resistance liquid is free to flow to a limited extent back and forth between the high and low pressure sides of the pistons and thereby permits of adapting the capacity of the absorber to the load which is being carried.

In front of the working chambers is arranged a replenishing chamber 33 which is adapted to hold a reserve supply of resistance liquid and feed the same to the working chambers as required. This liquid is introduced into the replenishing chamber through an opening in its top which is normally closed by a plug 34 and is delivered to the lower ends of the working chambers through one or more replenishing ports 35 formed in the lower part of the front wall 13 and controlled by check valves 36 opening toward the working chambers but closing toward the replenishing chamber.

Due to the reciprocating or oscillating action of the pistons the pressure in the working chambers is alternately increased or made greater and diminished or made less than that in the replenishing chamber. As a result the replenishing valve means allows a small quantity of the resistance liquid to be drawn into the lower ends of the working chambers during each low pressure stroke of the pistons. There is thus a tendency for liquid and air or gas, if there is any in the working chambers, to flow outward from the upper ends of the working chambers to the replenishing chamber.

Due to the change in pressure in the working chambers there is also a tendency for liquid and air or gas to return through the vent passage from the replenishing chamber to the working chambers during the low pressure strokes of the pistons.

The vent valve devices heretofore employed have not been entirely satisfactory to overcome this difficulty inasmuch as the same permitted air to pass from the replenishing chamber back to the working chambers, have wasted an undue amount of resistance liquid from the working chamber to the replenishing chamber, or have become clogged by the obstructing effect produced by small particles of foreign matter present in the resistance liquid.

In these prior vent valve means the vent passage was restricted and of relatively small cross sectional area compared to its length and extended between the working and replenishing chambers in such a way that liquid and entrained air or gas would flow either from the working chambers to the replenishing chamber, or from the replenishing chamber to the working chamber, depending on the relative pressure created by the action of the pistons, and these venting means were so organized that the same were liable to become clogged by dirt in the liquid and thus impair the efficiency of the instrument.

The present invention provides improved venting means whereby air and liquid are conducted from the upper ends of one or both working chambers to the replenishing chamber without permitting any foreign matter to obstruct the vent passages and without permitting any reverse flow of air from the replenishing chamber through the vent passage to the working chambers.

If desired two venting means embodying this improvement may be embodied in the shock absorber, one of which connects the upper high pressure end of the left hand working chamber 16 with the upper part of the replenishing chamber and the other connecting the upper low pressure end of the right hand working chamber 17 with the upper end of the replenishing chamber, as shown in Fig. 2. In case only one of these venting devices is used that between the upper end of the right hand working chamber 17 and the replenishing chamber is omitted and that between the upper end of the left hand working chamber 16 and the replenishing chamber is retained. Each of the venting devices shown in Figs. 1, 2, 3 and 5 is constructed as follows:

The numeral 37 represents a horizontal cylindrical opening extending through the upper part of the wall 13 from the replenishing chamber to one of the working chambers and provided at its inner or rear end with an internal forwardly facing shoulder 38. Within the inner or rear part of this opening and engaging with the shoulder 38 is a perforated washer or abutment ring 39 of metal. In the central part of this opening and engaging with the front side of the washer 39 is a filter plug 40 of compressed felt or other fibrous material. In the front or outer part of this opening is arranged a cylindrical retaining plug 41 of metal which engages its rear end with the filter plug and is held in place within the opening 37 by deforming or upsetting part of the front side of the wall 13 against the front end of the retaining plug, as shown at 42 in Figs. 1 and 3.

The corner at the inner end of the retaining plug is chamfered or beveled as shown at 43 so as to form a collecting chamber 44 between the filter plug and the retaining plug, and this collecting chamber is placed in communication with the replenishing chamber by a longitudinal groove 45 formed in the periphery of the retaining plug.

If desired the central part of the front end of the retaining plug may be provided with two grooves 46 at right angles to each other, as shown in Fig. 6, or a plurality of grooves 47 which intersect each other on the front end of the retaining plug, as shown in Fig. 7, so as to further increase the capacity of the collecting chamber between the filter plug and the retaining plug and lead any liquid and air passing through the filter to the longitudinal groove 45.

If desired the washer 39 may be omitted in which case the filter plug is engaged directly with the shoulder 38, as shown in Fig. 4.

As the pistons oscillate in the working chambers either during high or low pressure strokes the pressure in the collecting chambers will at no time be less than in the replenishing chamber. This will permit a movement of liquid with the entrained air or gas outward from the working chambers through the venting devices to the replenishing chamber but will not permit return movement of air or gas back from the replenishing chamber into the working chambers. Any liquid forced outwardly through the filter plug gathers in the collecting chamber between the same and the retaining plug and is conducted by the vent passage to the replenishing chamber.

The restricted cross sectional area of the vent passage compared with its length limits the travel of the liquid and air through the same so that at no single stroke of the pistons will there be a movement of any part of the liquid completely through the vent passage. The vent passage will thus be at all times sealed by some liquid of the previous piston stroke against a return movement of the air and gas.

The fibers of the filter plug should be sufficiently close so that the interstices between the fibers are of less area than the area of the vent passages in the retaining plug. By this means any dust, packing or other foreign material present in the resistance liquid will be held back by the filter plug and prevented from clogging the vent passage, thereby maintaining the venting means in operative condition and permitting the absorber to function most efficiently.

In the modified form of this invention shown in Fig. 8 two pockets 56 are formed in the upper part of the upper partition section 18 which pockets are both connected with the upper part of the replenishing chamber by a restraining passage 57 formed in the wall 13, short branch vent passages 48 communicating with the pockets 56 and a collecting chamber 49 arranged between the long and short passages. Each pocket contains a filter plug 50. The upper ends of both right and left working chambers are thus vented into the replenishing chamber and air and liquid are permitted to pass from the working chambers through the filter plugs and vent passage to the replenishing chamber, but any dirt is caught by the filter and prevented from reaching the vent passages and obstructing the same.

In this last-mentioned construction some of the liquid and air or gas will also be forced from the high pressure end of one working chamber into the low pressure end of the other working chamber and a part of the liquid and air or gas will flow back through the connecting passage between these working chambers when the pressures are reversed due to the oscillation of the pistons.

Instead of making the retaining plug cylindrical and providing the same with a longitudinal vent passage, this plug may be provided with a screw thread 51 which engages with a screw threaded opening 52 in the wall 13, and the summit of one of these threads being removed, as shown in Fig. 9, or the summits of both of these threads being partly removed to form a spiral vent passage between the plug 41 and the opening in the wall 13 which receives this plug.

I claim as my invention:—

1. A hydraulic shock absorber having a working chamber which is provided in one of its walls with a permanently open but restricted vent passage, and a filter between said chamber and said passage.

2. A hydraulic shock absorber having a working chamber which is provided in one of its walls with a vent passage, a rigid retaining plug arranged in the outer part of said passage and having a groove, and a filter plug arranged in said passage and engaging the inner end of said retaining plug.

3. A hydraulic shock absorber having a working chamber which is provided in one of its walls with a vent passage, a rigid retaining plug arranged in the outer part of said passage and provided on its periphery with a longitudinal groove and at its inner edge with a chamfered edge, and a filter plug arranged in said passage and engaging the inner end of said retaining plug.

4. A hydraulic shock absorber having a working chamber which is provided in one of its walls with a vent passage, a rigid retaining plug arranged in the outer part of said passage and provided on its periphery with a longitudinal groove and at its inner edge with a chamfered edge, a filter plug arranged in said passage and engaging the inner end of said retaining plug, and an abutment ring arranged in the inner part of said passage and engaging with the inner end of said filter plug.

5. A hydraulic shock absorber having a working chamber which is provided in one of its walls with a vent passage, a rigid retaining plug arranged in the outer part of said passage and provided on its periphery with a longitudinal groove and at its inner edge with a chamfered edge, a filter plug arranged in said passage and engaging the inner end of said retaining plug, and an abutment ring arranged in the inner part of said passage and engaging with the inner end of said filter plug said wall provided with a shoulder engaging with the inner side of said ring and also with a deformation engaging with the outer end of said retaining plug.

6. A hydraulic shock absorber having a working chamber provided with a vent passage having a restricted section, and filter material in said passage in front of the inner end of said restricted section, said passage being always open to the flow of fluid.

In testimony whereof I hereby affix my signature.

RALPH F. PEO.